US010002161B2

(12) United States Patent
Balko et al.

(10) Patent No.: US 10,002,161 B2
(45) Date of Patent: Jun. 19, 2018

(54) MULTITHREADING AND CONCURRENCY CONTROL FOR A RULE-BASED TRANSACTION ENGINE

(75) Inventors: Sören Balko, Weinheim (DE); Matthias Miltz, Heidelberg (DE)

(73) Assignee: SAP SE, Walldorf (DE)

( * ) Notice: Subject to any disclaimer, the term of this patent is extended or adjusted under 35 U.S.C. 154(b) by 1140 days.

(21) Appl. No.: 12/327,771

(22) Filed: Dec. 3, 2008

(65) Prior Publication Data

US 2010/0138842 A1   Jun. 3, 2010

(51) Int. Cl.
    G06F 17/30      (2006.01)
    G06F 9/52       (2006.01)

(52) U.S. Cl.
    CPC ............ *G06F 17/3051* (2013.01); *G06F 9/52* (2013.01)

(58) Field of Classification Search
    USPC ......................... 712/102, 107; 718/102, 107
    See application file for complete search history.

(56) References Cited

U.S. PATENT DOCUMENTS

| 5,452,461 | A  | * | 9/1995  | Umekita et al. ............ 717/149 |
| 5,515,538 | A  | * | 5/1996  | Kleiman ....................... 710/260 |
| 5,564,047 | A  | * | 10/1996 | Bloem et al. |
| 5,680,602 | A  | * | 10/1997 | Bloem et al. |
| 6,148,325 | A  | * | 11/2000 | Schmidt et al. ............. 718/107 |
| 6,424,948 | B1 | * | 7/2002  | Dong et al. ................. 705/7.13 |
| 6,505,250 | B2 | * | 1/2003  | Freund et al. ............... 709/226 |
| 7,149,288 | B2 | * | 12/2006 | Digate et al. ............... 379/88.17 |
| 7,483,918 | B2 | * | 1/2009  | Chaudhuri et al. |
| 7,506,307 | B2 | * | 3/2009  | McCollum et al. ......... 717/117 |
| 7,539,974 | B2 | * | 5/2009  | Beck et al. .................. 717/117 |
| 8,566,829 | B1 | * | 10/2013 | Forecast et al. ............. 718/102 |
| 8,719,080 | B2 | * | 5/2014  | Ferry et al. ................. 705/14.1 |
| 2003/0074090 | A1 | * | 4/2003  | Becka et al. .................... 700/83 |
| 2005/0091640 | A1 | * | 4/2005  | McCollum et al. ......... 717/117 |
| 2005/0222996 | A1 | * | 10/2005 | Yalamanchi ..................... 707/4 |
| 2006/0036989 | A1 | * | 2/2006  | Chaudhuri et al. .......... 717/101 |
| 2006/0059484 | A1 | * | 3/2006  | Selvaggi et al. ............. 718/100 |
| 2006/0070025 | A1 | * | 3/2006  | Mauceri et al. ............. 717/106 |

(Continued)

FOREIGN PATENT DOCUMENTS

EP           935194 A2  *  8/1999     ............. G06F 9/46

OTHER PUBLICATIONS

Ramez Elmasri and Shamkant B. Navathe, "Fundamentals of Database Systems", The Benjamin/Cummings Publishing Company, Inc. ISBN 0-8053-0145-3, 1989, 95 pages.

(Continued)

*Primary Examiner* — Jacob A Petranek
(74) *Attorney, Agent, or Firm* — Mintz Levin Cohn Ferris Glovsky and Popeo, P.C.

(57) ABSTRACT

The subject matter disclosed herein provides methods and apparatus, including computer program products for rules-based processing. In one aspect there is provided a method. The method may include, for example, evaluating rules to determine whether to enable or disable one or more actions in a ready set of actions. Moreover, the method may include scheduling the ready set of actions, each of which is scheduled for execution and executed, the execution of each of the ready set of actions using a separate, concurrent thread, the concurrency of the actions controlled using a control mechanism. Related systems, apparatus, methods, and/or articles are also described.

18 Claims, 5 Drawing Sheets

(56) References Cited

U.S. PATENT DOCUMENTS

| | | | | |
|---|---|---|---|---|
| 2006/0107224 A1* | 5/2006 | Friend et al. | ............... | 715/764 |
| 2006/0130062 A1* | 6/2006 | Burdick et al. | ............... | 718/100 |
| 2007/0186210 A1* | 8/2007 | Hussain et al. | ............... | 717/106 |
| 2008/0294588 A1* | 11/2008 | Morris et al. | ............... | 706/47 |
| 2009/0164985 A1* | 6/2009 | Balko et al. | ............... | 717/162 |
| 2009/0327199 A1* | 12/2009 | Weber et al. | ............... | 706/48 |

OTHER PUBLICATIONS

Sun Microsystems, Inc., "Class ReentrantReadWriteLock" retrieved from http://java.sun.com/j2se/1.5.0/docs/api/java/util/concurrent/locks/ReentrantReadWriteLock.html, accessed on Dec. 3, 2008, pp. 1-10.

Raschid et al., "Simulation Based Study on the Concurrent Execution of Rules in a Database Environment", Journal of Parallel and Distributed Computing, [online], vol. 20, No. 1, Jan. 1994. Retrieved from the Internet: <URL: http://citesserx.psu.edu/viewdoc/summary;jsessionid=13E007D853ABA1B6A5F49A BDE91124C8?doi=10.1.1.46.6838> [retrieved on May 11, 2010].

Saygin et al., "Concurrent rule execution in active databases", Information Systems, vol. 23. No. 1, pp. 39-64 (1998).

Ceri et al., "Effective scheduling of detached rules in active databases", IEEE Transactions on Knowledge and Data Engineering, IEEE Service Center, Los Alamitos, CA, vol. 15, No. 1, pp. 2-13, Jan. 1, 2003.

Jin et al., "A Concurrent Rule Scheduling Algorithm for Active Rules", Data & Knowledge Engineering, vo. 60, No. 3, pp. 530-546, Feb. 8, 2007.

Xu Changxing et al., "Coupling Modes for Concurrent Active Rules", Proceedings International Conferences on Info-Tech and Info-Net (ICII) 2001, Beijing, vol. 3, pp. 345-354, Oct. 29, 2001.

Boris Shulman, "Transactions in Active Environment—abstract", Jan. 1, 2005, retrieved from the Internet: <URL:http://www.graduate.technion.ac.il/Theses/Advisors.asp?Key=15089>.

Communication pursuant to Article 94(3) EPC dated Aug. 22, 2013, for corresponding European patent application No. 09011385.3.

Elmsari, et al., "Fundamentals of Database Systems", Chapter 18, "Concurrency Control Techniques", pp. 641-668, 5th Edition, 2007.

Java 2 Platform Standard Ed. 5.0, downloaded from the Internet on Oct. 10, 2013, <http://docs.oracle.com/javase/1.5.0/docs/api/java/util/concurrent/locks/ReentrantReadWriteLock.html>.

\* cited by examiner

MULTITHREADING AND CONCURRENCY CONTROL FOR A RULE-BASED TRANSACTION ENGINE

FIELD

This disclosure relates generally to data processing and, more particularly, to rules-based processing.

BACKGROUND

Event Condition Action (ECA) is an example of a rules-based approach used in an event driven system, such as database systems. Typically, the ECA rule includes an event part for specifying what triggers the invocation of the ECA rule, a condition part, which is a logical test that, if satisfied to true, causes the action to be carried out, and an action part, which includes updates or invocations on the local data at the database. In a database system, the condition could simply be a query to the database, with the result set being passed to the action part for changes to the database. Actions could also be calls to external programs or remote procedures. ECA rules can be used for activities such as automatically enforcing document constraints, maintaining repository statistics, facilitating publish/subscribe applications, and executing business processes.

SUMMARY

The subject matter disclosed herein provides methods and apparatus, including computer program products, for rules-based processing.

In one aspect there is provided a method. The method may include, for example, evaluating rules to determine whether to enable or disable one or more actions in a ready set of actions. Moreover, the method may include scheduling the ready set of actions, each of which is scheduled for execution and executed, the execution of each of the ready set of actions using a separate, concurrent thread, the concurrency of the actions controlled using a control mechanism.

Articles are also described that comprise a tangibly embodied machine-readable medium embodying instructions that, when performed, cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWING

These and other aspects will now be described in detail with reference to the following drawings.

Like reference symbols in the various drawings indicate like elements.

DETAILED DESCRIPTION

Figure 1:
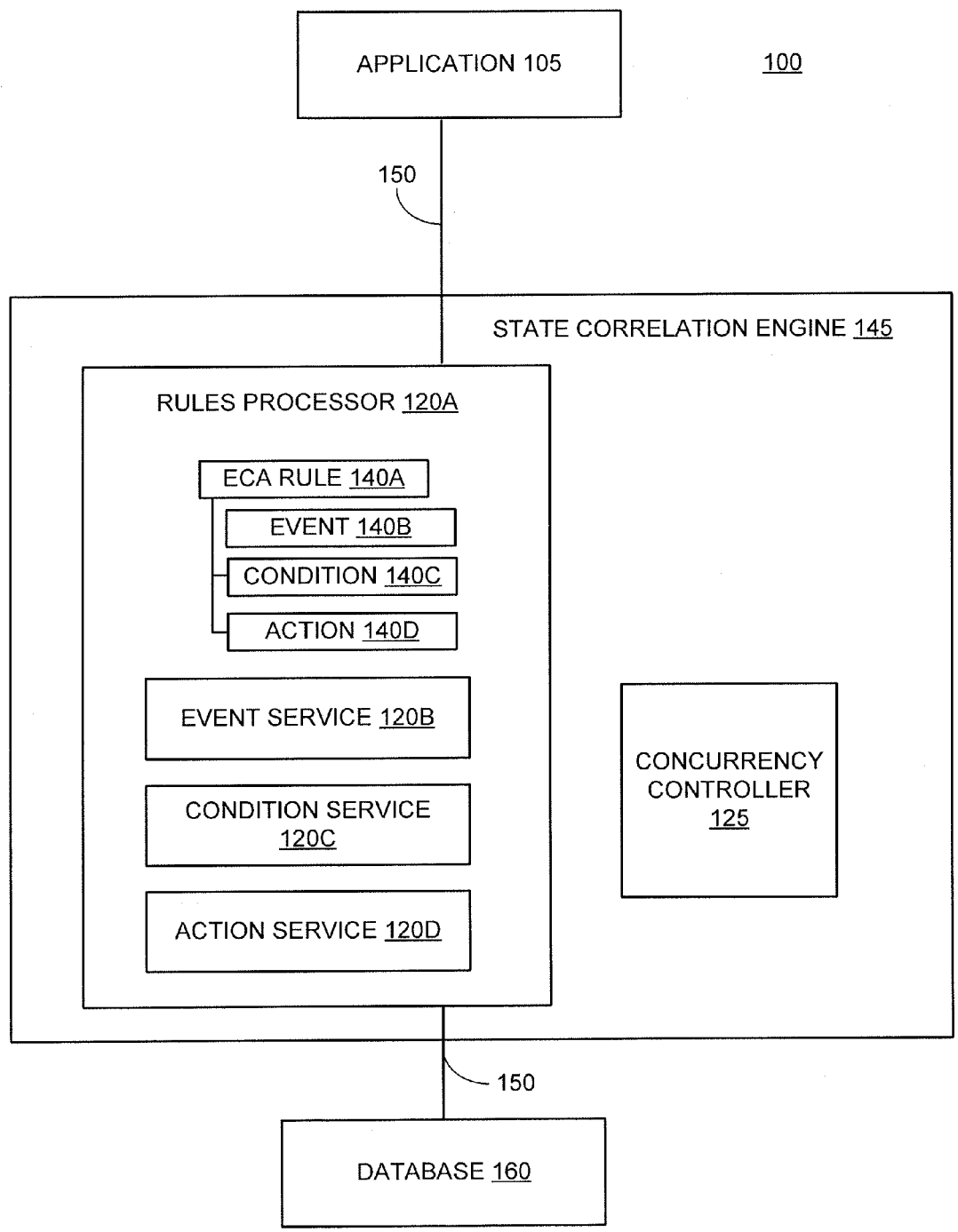
FIG. 1 illustrates a system 100 including a rules processor configured for multithreading.

FIG. 1 depicts a system 100 including an application 105, a state correlation engine 145 including a rules processor 120A, and a database 160, all of which are coupled by a communication mechanism 150, such as the Internet, an intranet, and the like.

From the perspective of application 105 the state correlation engine 145 may appear to behave like a database. Database 160 may be implemented as any type of storage mechanism. However, in the implementation of FIG. 1, database 160 is implemented as one or more of a relational database, an XML database (e.g., a data persistence software system that allows data to be imported, accessed and exported in the XML format), and the like.

The rules processor 120A is an example of an event, condition, action ("ECA") rule processor. The rule processor 120 processes one or more rules (e.g., ECA rule 140A), parses each of the rules into an event part, a condition part, and an action part, as described further below. Moreover, the rules processor 120A may be used to process ECA rules, as described further below. Rules processor 120A may define ECA rules, remove ECA rules, activate ECA rules, deactivate ECA rules, search ECA rules, browse ECA rules, persist ECA rules, and the like. Moreover, rules processor 120A may support the synchronous/asynchronous ECA rule execution roundtrips.

The rules processor 120A includes an event module 120B, a condition module 120C, and an action module 120D, all of which are further described below. The modules 120B-D control and execute methods (also referred to as operations) specified by an ECA rule received at rules processor 120A. Rules processor 120A further includes ECA rule 140A. Rules 140A are provided to the state correlation engine 145 by a modeling system. The ECA rule 140A further includes an event part 140B, a condition part 40C, and an action part 140D.

Rule processor 120 may include an application program interface ("API") for receiving, from application 105, an event, which may have a corresponding ECA rule, such as rule 140A. When an event is received, rules processor 120A may parse the ECA rule 140A into parts, such as the event part 140B, a condition part 140C, and an action part 140D.

The event module 120B detects particular types of events, which may be included in ECA rule 140A. Moreover, the event 140B may include event rules to either detect simple or complex events. A simple event may detect a particular attribute (e.g., detecting the reception of a product identifier, such as UPC code). The event part of an ECA rule may include a list of state variable types the condition relates to.

Once an event is detected, the event is received by the condition module 120C. Condition module 120C evaluates conditions to enable or disable and, if required, synchronously execute the action part of the ECA rule.

Next, an action module 120D may receive the event and apply the methods specified by the rule actions (i.e., the actions determined by the rules). For example, rules processor 120A may parse ECA rule 140A into one or more events 140B, one condition 140C, and one action 140D. As such, event module 120B detects the event(s) 140B, condition module 120C evaluates condition 140C (e.g., evaluate conditional expressions). If the condition 140C of the ECA rule 140A is satisfied, then operations associated with ECA rule 140A may be executed. Next, action module 120D perform one or more actions specified by the rules. Specifically, for asynchronous rule execution, the action part (instantiated with the events) of an ECA rule is inserted into a ready set for subsequent execution, as described further below.

In some implementations, the subject matter described herein may be used in connection with a state correlation engine for continuous evaluation of event-condition-action (ECA) rules, as well as triggering of follow-up transactions. The state correlation engine 145 may be implemented as a rule-based event filtering and correlation module that runs at a gateway server, such as the server hosting rules processor 120A. The state correlation engine 145 typically processes events before forwarding them to an event server. Correlation and filtering of events by the state correlation engine is controlled by ECA rules.

The state correlation engine 145 may execute models of a business process or other high-order paradigms that are represented by event-condition-action rules, which in turn may be represented as networks of events, conditions, and actions, such as a model for the state correlation engine. The model for the state correlation engine 145 may be derived from one or more paradigms for modeling business processes, such as a control flow based modeling language (e.g., Business Process Modeling Notation (BPMN) or BPEL (Business Process Execution Language)). The model for the state correlation engine 145 may be mapped from other paradigms due to its use of basic building blocks from which modeling constructs of other modeling paradigms may be mapped.

The state correlation engine 145 (also referred to as a correlation engine) as described herein may be a component of system 100 and may include rules processor 120 to processes event-condition-action rules that represent a process. The state correlation engine 120 may process the rules to effectively correlate a state of execution of the process represented by results of execution of rules with new events (e.g., new, incoming events). For example, the state correlation engine 145 may be a component of a business process management (BPM) system, a complex event processing (CEP), a business activity monitoring (BAM) system, a business rules management (BRM) system, and any other system using at least one of rules, conditions, and events.

In some implementations, the state correlation engine 145 may provide for continuous execution of rules by being continuous in the sense that execution of rules may be triggered by the execution of earlier rules which may result in further execution of rules. For example, a first rule R1 having a first action A1 may be executed as a result of a first event E1. Execution of the first rule R1 may result in the execution of the action A1, where the action A1 involves changing a state variable V1 from a value L1 to another value L2. The change of the state variable V1 may cause a state correlation engine to generate an event E2 that includes a before image with V1 as L1 and an after image with V1 as L2. The event E2 may be flooded in all rules, which may cause a second rule R2 to be executed, where the second rule R2 requires the event E2 (or multiple events) before it is executed. As a result of the execution of R2, a second action A2 may be executed, which may result in an event E3, which may, in turn, cause another rule to be executed.

The state correlation engine 145 may further provide for stateful execution of rules in the sense that a state of execution may be retained across execution of rules (e.g., information about state may be retained across execution of rules and changed according to actions of rules or otherwise as a result of events). State may be retained by state variables being instances of objects of a type language, retaining a state of selections of condition network channels within rules, and a state of operator nodes (e.g., retaining tables in joins and Cartesian product operator nodes across subsequently executed rules).

Although the term event may be used in the following description to refer to an event object, which may be an object of an object-oriented or other type of data structure of another type of computer-implemented language (where the event object may be implemented as a combination of images of objects of a type language), the term event may also refer to an event in a broader sense, which may be an occurrence or happening. For example, an event may be the receipt of a message that may cause the generation of an event object (which may also be referred to as an event).

A condition 140C is based on expressions in first order logics evaluated using a network of stateful and stateless operator nodes. Moreover, the ECA rule 140A may be used to represent large-scale business applications, such as business processes, complex event processing patterns, status and action models, and the like.

At a given point in time, the rules processor 120A may be required to process multiple incoming events. In any case, a plurality of state variables may coexist in the rules processor 120A such that an ECA rule may be applicable to different objects at a given point in time. For instance, multiple process instances may exist in parallel and may also need to be concurrently executed on the same rules processor 120A. Moreover, even a single model instance may require concurrent processing of different rules that operate on the same state. For example, a business process model may comprise parallel control flow branches where activities on these branches can be executed in parallel.

In order to improve scalability (e.g., for users, state variables, rules, and the like) by yielding low execution latencies and increasing transaction throughput and to foster fair execution of the ECA rules (e.g., where a long-running rule does not prevent other rules from being executed with reasonable latencies), the rules processor 120A processes a multithreaded rule execution with full concurrency control. That is, ECA rules should be executed in a transactional manner and concurrently executed rules must be isolated from one another. For example, the rules processor engine 120A may be implemented to support two types of roundtrip transactions for the ECA (referred to as an ECA roundtrip transaction). Moreover, the rules processor 120A may execute the ECA roundtrip transaction by either synchronously executing or asynchronously executing the "action" part 140D, which is either executed as part of the transaction, which has triggered evaluation of the corresponding condition part 120C or asynchronously de-coupled in a separate follow-up transaction. An event may, however, trigger multiple rules, some with a synchronous execution roundtrip, and others with an asynchronous roundtrip. The subject matter described herein may provide a solution by using a multithreaded transaction execution at the rules processor engine 120A.

The system 100 uses multithreaded transaction execution into the state correlation engine 145 and rules processor 120A. Specifically, any ECA rule translates into one transaction (which can be executed by the state correlation engine 145 and rules processor 120A synchronously) or multiple transactions (which can be executed asynchronously). For the asynchronous case, the triggering event(s) may be delivered in distinct transaction(s), whereas the action is executed in a separate transaction. Nonetheless, the roundtrip of a transaction comprises executing an action part 140D (e.g., performing updates of state variables); evaluating the condition part(s) 140C of the rule of all deployed rules atop the altered state of the state correlation engine 145 and rules processor 120A; directly executing the action part(s) of all synchronous rules whose conditions are in effect (e.g., re-entering thus the roundtrip transaction cycle, but as a nested transaction); and scheduling for execution the action parts 140D of the asynchronous transaction rules (which have a condition in effect) in other follow-up transactions.

Any event 140B (e.g., a state variable update that happens in a transaction) may, thus, spawn multiple asynchronous follow-up transactions which may also qualify for execution at the same time. The system 100 may use the operating system (or other execution frameworks, such as the Java Virtual Machine), threads, and the like to execute these transactions in parallel. The subject matter described herein may also configure state correlation engine 145 and/or rules processor 120A to provide fine-granular locking mechanisms as part of the transaction roundtrips of the rules 140A. For example, each state variable which is accessed (e.g., updated) by the action part 140D of a running transaction will be read locked or write locked using mechanisms for shared and/or exclusive locks. Specifically, the state correlation engine 145 analyzes the actions to be performed by a transaction and only schedules that transaction for execution, if the necessary shared and exclusive locks can be acquired at a given point in time. In this way, the transactions may be executed without ever having to perform a roll back (caused by locks, which cannot be acquired).

In some exceptional cases, a lock on a state variable may have to be upgraded in the course of executing an action script from a shared lock to an exclusive lock, so that the state correlation engine 145 can provide a mechanism for waiting to upgrade a lock and rolling back the transaction if that lock cannot be granted in some finite time period. Moreover, when evaluating rules before committing the update batch of a transaction, stateful operator nodes may place exclusive locks onto the affected fragment of their internal transient state. This is due to the fact that the operator state is shared among concurrently evaluated rules (as part of transaction commits), which may mutually influence one another, as changes to the operator state caused by a non-committed transaction should be isolated from (i.e., not visible to) other concurrently running transactions. To that end, the state correlation engine locks the affected state fragment. For instance, join operators of rules 140A will exclusively lock the rows of their internal matching table, which were affected by the processed events. For example, the state correlation engine 145 places fine-granular locks onto the state to improve latencies of concurrent transactions operating on other fragments of the operator states.

Moreover, the state correlation engine 145 may also use a so-called "optimistic approach" to provide concurrency control in dedicated cases (e.g., first-order logics capabilities of rule execution when reasoning over a complete type extension, i.e., all state variable instances of a type), which have a running transaction that violates the condition of another concurrently running transition. For example, a condition of some transaction T1 checks for the non-existence of a variable s of type S in some particular state (e.g., non-existence of s with s.key=4711) that is violated by another, concurrently running transaction T2, which creates and/or modifies a variable accordingly (e.g., update the key of some instance of S to 4711). In the example, the state correlation engine 145 deviates from existing approaches (which places a coarse-granular lock onto the complete extension set of existing instances of the type S) by identifying the conflicting case when the action part of T2 is committed. A successful commit would result in disabling T1, which is already running. The state correlation engine 145 then rolls back T2 to guarantee consistency. In some implementations, the state correlation engine 145 is thus able to improve throughput, when compared to approaches that lock the entire type extension because the state correlation engine 145 does not need to provisionally place locks on type extensions whenever it creates, alters, or deletes a state variable of that type. In turn, the state correlation engine 145 takes advantage of the underlying ECA mechanism itself to detect conflicting situations and, thus, postpone (or roll back) those transactions causing a conflict.

Figure 2:
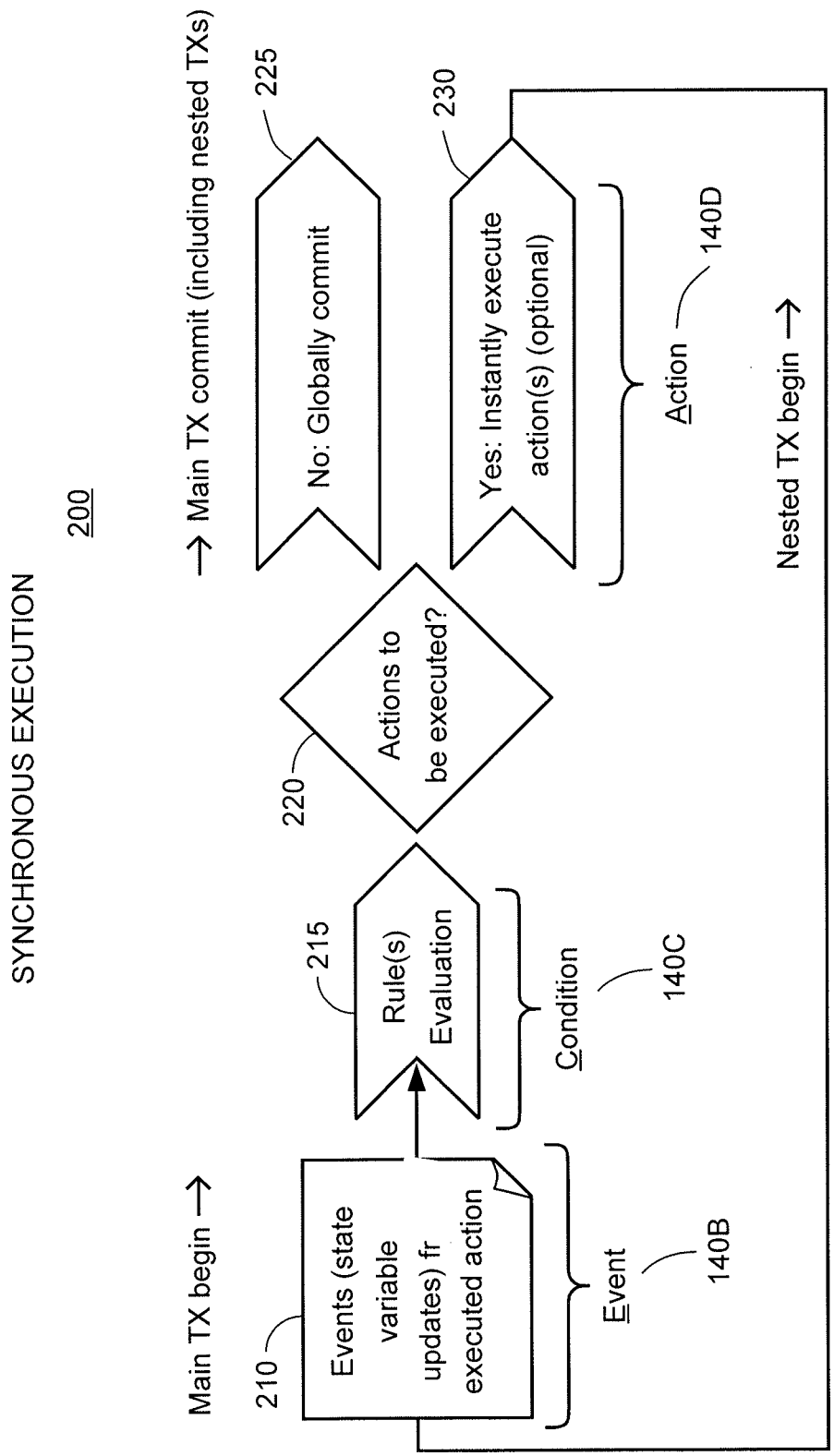
FIG. 2 illustrates a process 200 synchronous execution of rules using system 100.

FIG. 2 depicts a process flow diagram of a single rule (referred to as synchronous execution). In the synchronous execution case, the follow-up actions are executed within, for example, a running transaction that has delivered the respective event(s). That is, locks may be upgraded and additional locks may be acquired, and the same concurrency control mechanisms are in place for this prolonged transaction. At 210, a transaction begins when an event 140B is processed by the rules processor 120A. For example, the event may be an update of one or more variables at state correlation engine 145 or rules processor 120A. These state variables may be implemented as one set of state variables, which is maintained by the state correlation engine. Moreover, that update may be a result of another action(s) 140D executed by rules processor 120A.

At 215, rules processor 120 may then evaluate the rule(s) 140A by processing the condition 140C part of the rule. For example, rules processor 120A may evaluate one or more conditions 140C and flag any conditions for execution (e.g., the rules processor 120A may evaluate the condition of one or more, if not all, of the rules).

At 220, if rules processor 120 determines that actions 140D are to be executed as a result of processing the conditions 140C, the round trip transaction for synchronous execution is performed (e.g., any synchronously executed action may spawn a nested transaction of the main, running transaction). When the main transaction is performed (e.g., committed to persistency, such as a database), state correlation engine 145 does not globally commit, at 225, nested transactions. The event (which is delivered in a transaction) may spawn the synchronous actions, which may be performed in nested transactions of that main transaction. The global commit of the main transaction and all nested transactions therein are deferred until no further synchronous follow-up actions are being triggered. The state correlation engine 145 may, at 230, execute (e.g., instantly commit) synchronous transactions to perform the actions 140D.

Figure 3:
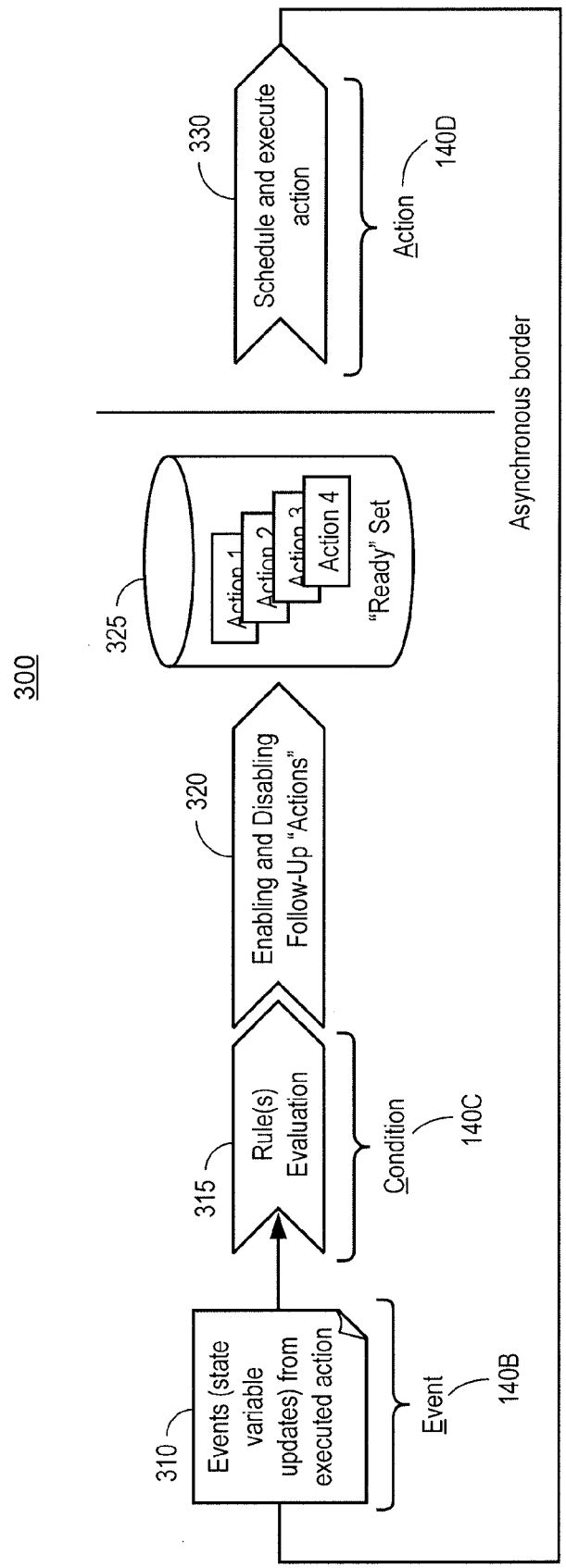
FIG. 3 illustrates a process 300 asynchronous execution of rules using system 100.

FIG. 3 depicts a process flow diagram of for asynchronous execution.

At 310, a transaction begins when an event 140B is processed by the rules processor 120A. For example, the event may be an update of one or more variables at state correlation engine 145 or rules processor 120A. Moreover, that update may be a result of other actions 140D executed by rules processor 120A.

At 315, rules processor 120A may then evaluate the rule(s) 140A by processing the condition 140C part of the rule. For example, rules processor 120A may evaluate one or more conditions 140C.

At 320, rules processor 120A may enable and disable subsequent actions. For example, the ECA rule set may include a plurality of actions 140D, some of which are enabled for asynchronous execution and other actions are disabled because there condition is not satisfied (e.g., valid, true, etc.). Thus, an action becomes disabled if it was enabled before and its condition is no longer true after this event.

At 325, state correlation engine 145 and/or rules processor 120A fetches actions from a ready set of actions enabled at 320. At 330, a scheduler at rules processor 120A may schedule the enabled actions (e.g., actions 1-4) for execution, and then the actions are executed. Each action may occur within a single transaction. Each action may create other actions, which may serve as an input at 310. A transaction refers to, for example, a unit of work performed within a system, such as a database management system. The transaction may include a beginning work, one or more executed data manipulations/queries, a commit (e.g., if no errors occur in the transaction), or a rollback (e.g., if errors occur in the transaction). In the context of the state correlation engine, state variables are being read (e.g., using queries) and manipulated (e.g., created, altered, deleted, and the like)

Moreover, the process 200 and 300 may be implemented in a multithreaded system. For example, rules processor 120A may evaluate stateful ECA rules in a multithreaded manner. Moreover, the transactional evaluation of stateful ECA rules also includes consistency guarantees, i.e. all actions 140D whose conditions hold are enabled (e.g., ready for execution) at a time even if the actions were enabled from effects (e.g., state variable updates) originating from different, concurrent transactions. Moreover, the concurrency control mechanism (which is described further below) may include fine-granular concurrency control mechanisms, including two-phase locking (e.g., read and write locks are atomically acquired on begin and released on commit) on state variables, rowlocks in (stateful) join operators, and a so-called optimistic approach to only roll back when a semantic conflict is detected between concurrent transactions. Moreover, the rules processor 120A may detect semantic conflicts as mutually violating pre-conditions of actions (i.e., actions that cannot jointly be enabled). The following provides examples of concurrency control used by state correlation engine 145 (and, in particular, rules processor 120A).

The examples given for the concurrency control mechanisms are used to safeguard multithreaded, transactional ECA rule execution performed by state correlation engine 145 and rules processor 120A. The concurrency control mechanisms may be implemented by concurrency controller 125. Moreover, although concurrency controller 125 is depicted as separate from rules processor 120A, concurrency controller 125 may be included in other locations as well as distributed among a plurality of locations. The concurrency controller 125 uses a stateful execution model where concurrently and/or continuously running rules 140A operate on the same set of global state variables. In some implementations, the latter (i.e., continuously running rules) is a feature of the state correlation engine 145. The example implementations of the concurrency controller 125 are meant to illustrate both the effectiveness and efficiency of example implementations of concurrency control. In some cases, effectiveness is measured as a function of one or more of the following: having full ACID-compliance for the transactional rule execution roundtrip (which essentially boils down to the serializable transaction isolation level); and establishing additional guarantees concerning the content of the so-called "ready set." At any point in time, the ready set does exactly contain those transitions whose associated condition holds for a combination of committed state variables. If multiple transitions may concurrently and continuously modify the state create, delete, or alter state variables of the state correlation engine 145 and/or rules processor 120A, the ready set of actions should be kept in a consistent state.

For example, the ready set of actions may include transitions, which are instantiated, with a tuple of (committed) state variables, action scripts (e.g., as part of ECA rules) that are ready to be scheduled for asynchronous execution. Each of the actions represents a script of update commands, which are to be applied on a concrete combination of state variables. In that sense, a transition is the action script of an ECA rule parameterized with a combination of state variables for which the rule's condition holds true.

Concurrency controller 125 may implement so-called "state variable locking." When this is the case, any state variable that is being used within a transaction is locked. The state correlation engine 145 (and/or rules processor 120A) may (i) employ a strict two-phase locking protocol (S2PL, or variations thereof) and (ii) additionally acquire locks conservatively (CS2PL), if applicable. That is, (i) all locks that were used within a transaction are jointly released as part of the commit in one atomic step and (ii) locks are atomically acquired if possible. By conservatively acquiring all locks at the beginning of a transaction, deadlocks may be avoided, which in some (if not all) implementations, improves throughput and thus efficiency. In some cases, a priori analysis of transitions does not yield the complete set of exclusively accessed state variables, which may be used to provide a so-called "conservative" two-phase locking. For instance, if a transition triggers a synchronous follow-up rule, the action of a follow-up rule (which is executed within the same transactional context as the original transition) may access additional state variables, resulting in additional locks being acquired or existing locks being upgraded from shared to exclusive. Those situations represent potential deadlocks if a concurrently executing (e.g., independent) transaction holds an incompatible lock on an affected state variable. For example, the first transaction may initially wait for a finite duration then retry to acquire the lock. If that fails, the state correlation engine 145 executes a rollback of the transaction to provide a guarantee for the transactional behavior of rule execution and to avoid deadlocks.

For example, the following provides an example related to business process management scenario. In the following example, this scenario is an event-based workflow pattern (e.g., represented as a so-called "deferred choice" workflow pattern in a business process management network), where continuation of a process instance on a particular branch depends on the type of event that comes in. For instance, a process may implement a timeout scenario, where the process waits for a message, but stops waiting after, for example, one minute. In that sense the competing events are message has come in and one minute has elapsed, which represents the following two rules depicted at Tables 1 and 2.

TABLE 1

An example of a timeout rule

```
rule timeout_occurred:
if (exists Process p) (exists Token t) (exists TimeOutSignal s)
with t.owner=p and t.position=<at deferred choice>
then enable action {
t.position=<timeout branch>
}
```

TABLE 2

Example of a Message Received Rule

```
rule message_received:
if (exists Process p) (exists Token t) (exists Message m)
with t.owner=p and t.position=<at deferred choice>
then enable action {
t.position=<regular branch>
}
```

The rules depicted at Tables 1 and 2 illustrate that the components of an ECA rule are events (i.e., state variables that were changed), conditions, and actions to be executed. Moreover, the events and conditions of "timeout_occurred" and "message_received" are partially overlapping since both cases require that there is a process instance and a token (e.g., representing some control flow within that process instance which waits at the deferred choice gateway for either of the events to be received). Depending on whether a timeout signal or a message is received at the state correlation engine 145, the flow of rules processing at rules processor 120A continues on an so-called "happy path" (i.e., without timeouts) branch or on a dedicated so-called "timeout" branch, in which some error handling may take place.

Supposing a message is received at state correlation engine 145 and that received message is shortly followed by a timeout event, both the actions associated with the "message_reveived" and "timeout_occurred" rules of Tables 1 and 2 are instantiated and inserted into the ready set of actions (e.g., as depicted at FIG. 3 at 325). The scheduler (which is capable of handling multiple threads of actions concurrently) may now schedule both actions related to "message_received" and "timeout_occurred" as two independent threads. The "message_received" transition initially acquires shared locks on the process and message instances and an exclusive lock on a token instance (e.g., because of the write access that occurs in an action script) and then commences executing its action script (e.g., a single command to flip the token's position or attribute value). At the same time, a "timeout occurred" transition needs to acquire locks. It typically succeeds to acquire shared locks on the process and time out event instances, but may fail to acquire an exclusive lock on the token instance (which is currently held by the "message_received" transition). Supposing a "timeout_occurred" is rolled back but stays in the ready set as its condition is still true on the committed engine state, the scheduler of state correlation engine 145 may re-schedule transition, which has rolled back following a fair scheduling strategy. In the meantime, the "message_received" will ultimately complete, releasing its locks. However, during a commit phase, the conditions of all rules are re-evaluated, resulting in both transitions being disabled for the token because the predicate "t.position=<at deferred choice>" which is part of both conditions of the rules no longer holds true, resulting in both transitions being removed from the ready set.

In that sense, state variable locking has actually taken care of ACID-compliant execution of "message_received" ("lost update" phenomenon avoided by having "timeout_occurred" roll back). At the same time, ready set consistency may be taken care of by automatic re-evaluation of rules during the commit of the update of the token state variable.

Concurrency controller 125 may implement so-called "fine granular operator state locking." The second concurrency control mechanism affects the condition evaluation, which relies on a variant of the Rete algorithm. Generally, Rete evaluates conditions on top of operator graphs (in this case called a "Trigger Network"), which is similar to database access plans. In the case of system 100, condition evaluation by rules processor 120A and/or state correlation engine 145 is stateful (e.g., a condition is evaluated on top of newly incoming event(s) and the existing correlation engine state which was build up from earlier transactions). A feature of state correlation engine 145 (and/or rules processor 120A) is that non-unary operators (e.g., joins and Cartesian products) maintain updates that were seen in earlier transactions in some internal data structure. That data structure is optimized for implementing the actual semantics of the respective operator. In cases of joins, it is a 3-column, multi-row table whereas for Cartesian product it is a two-column, single row table.

The internal join state table reflects the join criterion which represents an equality predicate between two state variables, e.g. "token.owner=process". During condition evaluation, updates are pushed through the Trigger Network, entering operators on input channels. In case of the join operator, its input channels represent the left and right operand of the join clause. The join operator will correlate updates that come in on any of its two input channels with the internal join state and the updates (if any) that comes in on the opposite input channel. It does so by constructing a composite key using the state variable images contained in the updates, selecting the state table row that corresponds to this key, materializing the update in the join table, and constructing combined updates (e.g., from the incoming update and the existing content in this join table row), which are sent out to the join's output channel. Concurrency control may be used in between the materializing and constructing phases, in which concurrency controller 125 applies the fine granular locking described herein whenever a certain row of, for example, a join table is accessed (in which case the join table is exclusively locked for the remainder of the transaction). In other words, no concurrent transactions can make accesses to this row and will have to wait for the first transaction to complete or roll back. For example, a join table row essentially corresponds to a certain key. Other transactions which yield state variable updates for this particular key will not be able to access this row, thus, having to wait for a finite period of time then retry or roll back. On the contrary, other transactions resulting in updates that do not affect this key will be able to complete normally.

To further illustrate the reason for the above-described fine locking strategy, the following example is provided. Supposing there is a simple message collecting scenario where incoming messages (e.g., from some messaging back-end system to correlation engine 145) is matched by concurrency controller 125 with so-called "subscriptions" (which represent parties to which the received message is dispatched), the subscription formulates a criterion (e.g., a match clause) to express which messages are of interest for the subscription. For example, assume this match clause to be a plain equality predicate between two "id" and "key" attributes on the message and subscription side, respectively, i.e. "message.id=subscription.key". On top of this, subscriptions can be switched on and off (e.g., represented by a Boolean attribute "active") to temporarily disable message receipt (e.g., if the recipient cannot currently process any messages). Whenever an incoming message matches an active subscription, it shall be processed in some transition. For instance, it could be forwarded to another backend application. If formulated as an ECA rule, that scenario would translate to the rule depicted at Table 3. Moreover, the corresponding trigger network 400 is depicted at FIG. 4.

TABLE 3

Example Receive Message Rule rule receive_message:
if (exists Subscription s) (exists Message m)
with s.active and m.id=s.key
then enable action {
// some message processing code
}

Figure 4:
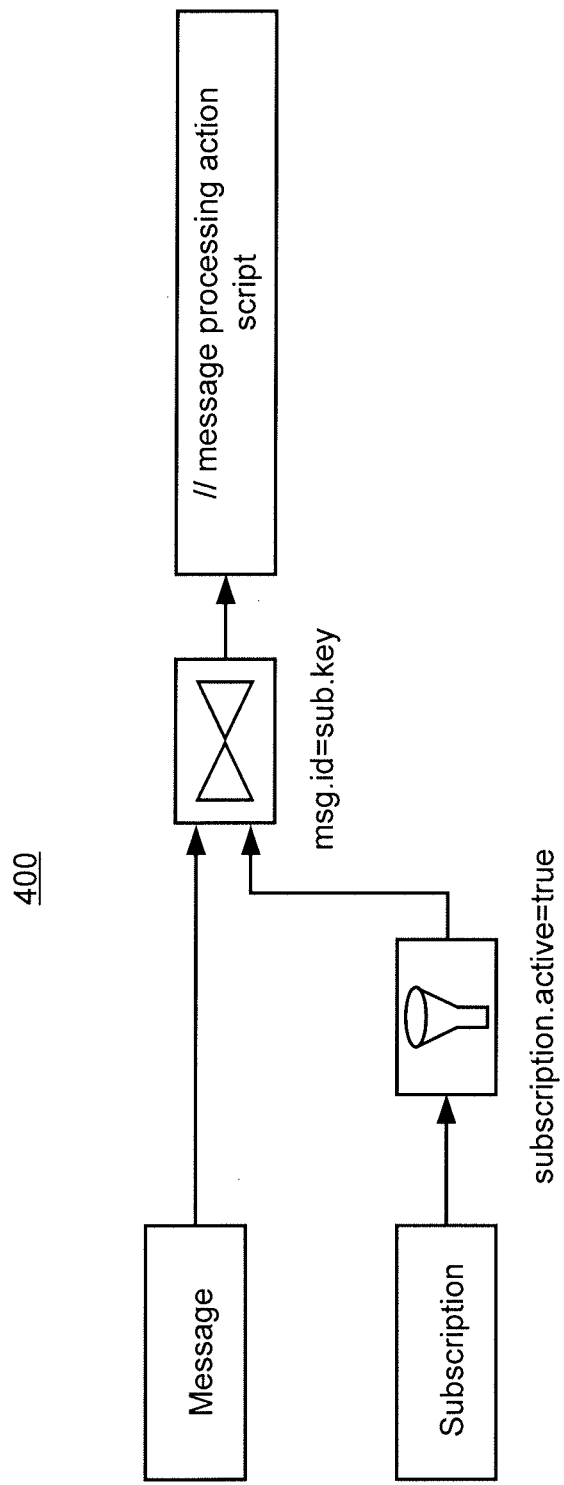
FIG. 4 illustrates an exemplary trigger network 400 illustrating the concurrency control locking mechanisms described herein.

Referring to FIG. 4, there are two entry points (so-called "source nodes") representing the "Message" and "Subscription" types. Any event related to state variables of those types will enter the Trigger Network 400 at the corresponding source nodes. The inner nodes of that plain network comprise a stateless filter operator and a stateful join operator. Filters essentially check some selection predicate on the incoming updates. In the given example, they check for subscriptions to be active. The join operator maintains an internal 3-column state table (e.g., key, left operand, right operand). This state table is initially empty. Supposing some active subscription s(true,4711) is created where the value of the "key" attribute (4711) implicitly represents the match clause, the corresponding create update (e.g., s(true, 4711) passes through the filter and populates the join table, as depicted at Table 4. As there is no matching message, the state correlation engine 145 performing the join will not send out any updates but only create a new row in the join table (corresponding to the key value 4711) and copy the subscription object into its right column.

TABLE 4

| Example Join Table | | |
|---|---|---|
| Key | Left Operand | Right Operand |
| 4711 | <empty> | s(true, 4711) |

Supposing two transactions t1 and t2 concurrently execute and resulting in two updates (e.g., t1 creates a new message instance m(4711) and t2 flips the active flag of the existing subscription to a logic false), there are apparently no jointly used state variables for the two transactions, i.e., t1 and t2 operate on disjoint state variables (e.g., m(4711) and s(false, 4711)). In essence, the above described state variable locking does not stop both transactions from being executed in parallel. If there was no other locking mechanism in place, state correlation engine 145 may violate the ready set consistency criterion if any of the two transactions fails after having pushed its updates through the join operator (e.g., the dirty read phenomenon). To illustrate, assume t1 initially pushes the create update (e.g., m(4711)) to the operator. In this case, what happens next is that a match partner s(true, 4711) is found in the internal join table and a combined create update (e.g., m(4711), s(true, 4711)) is sent to an output channel (which ultimately instantiates the message consumption transition and inserts it into the ready set). The altered join table depicted at Table 5 depicts the new provisional state where the effect of t1 is not yet committed and can still be rolled back (depicted as italic text).

TABLE 5

| Example Join Table | | |
|---|---|---|
| Key | Left Operand | Right Operand |
| 4711 | *m(4711)* | s(true, 4711) |

Next, t2 causes a push of an alter update (e.g., s(true, 4711)→s(false, 4711)) to the filter operator (subscription. active=true), which sends a delete update (e.g., s(true, 4711)→ .) to the join. In response, the join will remove the subscription instance from its state accordingly and send out a delete update (e.g., m(4711), s(true,4711)→ .), which disables (i.e., removes from the ready set) the respective message consumption transition, as depicted by the empty of Table 6.

TABLE 6

| Example of a Join Table | | |
|---|---|---|
| Key | Left | Right |
| 4711 | *m(4711)* | <empty> |

Figure 5:
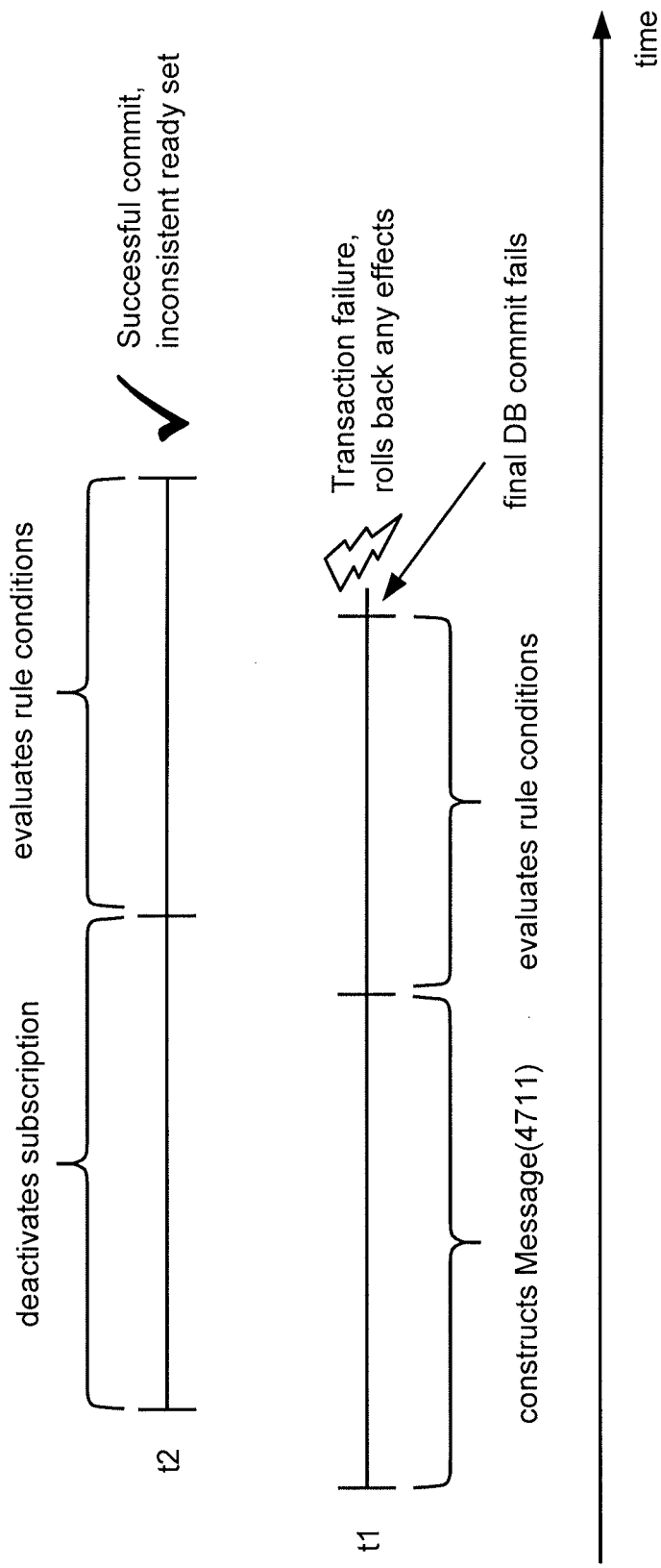
FIG. 5 depicts a chronological sequence of process that lead to an inconsistency which may be controlled using the concurrency control mechanisms described herein.

Now supposing t1 was actually triggered by some reliable messaging system (which delivers messages in a database transaction), state correlation engine 145 (and, more typically, concurrency controller 125) expects failures outside the rule processor 120A engine in such scenarios (for instance a database error which lets t1 roll back). In other words, t2 has read some effects from t1 (within the altered join table) which were then rolled back. In this case, t2 has sent out a delete update disabling a transition that was never successfully enabled which is obviously an erroneous, inconsistent behavior. Concurrency controller 125 removes a transition from the ready set, which is not present. FIG. 5 depicts a chronological sequence of process that lead to the inconsistency.

Referring to FIG. 5, the example illustrates a selected conflict variant. Specifically, even when both t1 and t2 both commit successfully, an inconsistency arises from the fact that t2 may complete before t1, again trying to alter the ready set based on uncommitted data. In order to overcome those problems, stateful ready set operators must exclude concurrent accesses to (portions of) their internal state for the duration of a transaction.

In order to still have good transaction throughput, the concurrency controller 125 for each transaction may acquire locks on small fragments of the internal operator state to allow for concurrent operator visits operating on disjoint subsets of the state. For example, modifications to a subscription instance which matches messages having an identifier of "4712" do not need to be blocked when a message for a key of "4711" comes in, as their keys are clearly different. In case of the join operator, any access to the internal state table will place an exclusive lock on the affected row (as identified by the key). Any concurrently running transactions, which also visit this join node during their condition evaluation phase, will not be permitted access to this join row but will only be allowed to access the non-locked parts of the join state. Whenever a "row lock"

cannot be acquired, the respective transaction will initially wait for a finite period and retry to acquire the lock. If that fails for a configurable number of times, the transaction, which could not acquire the lock, will be rolled back. A transaction, which could acquire all needed rowlocks, may then make its modification to the state table and continue with traversing the Trigger Network and ultimately committing successfully. Rowlocks will be jointly released when the transaction effects were materialized and the ready set was updated.

Concurrency controller 125 may implement so-called "optimistic, condition-based ready set" consistency, as described further below. Finally, rule conditions 140C are not restricted to propositional logics but allow for predicates in first order logics. That is, variables are bound by existential or universal quantifiers, which in some implementations enhance expressive power, which allows for reasoning over domains of discourse (which is not possible with pure propositional Boolean logic). For example, a first order capability can be exploited to enrich the message receipt scenario described above by a feature called a "conditional start." The concurrency controller 125 may provide a conditional start, which is a use-case from system-to-system business processes to collect and aggregate a number of incoming messages. For instance, a process named "pack_pallet" (e.g., simply represented by subscription) collects a fix number, n, of RFID signals, each of which represents a good that passes by an RFID scanner before it is packed onto a pallet for shipment. Whenever the process collects enough signals (e.g., denoting a full pallet), the process disables its subscription and conducts some post processing (e.g., computing the total price of all goods on this pallet). Whenever no active subscription (e.g., a collecting process) exists (e.g., the n+1-th signal comes in), a new subscription is created. The conditional start is depicted at Tables 7 and 8 below.

TABLE 7

Example of a Conditional Start rule conditional_start:
if (exists Message m) (not exists Subscription s)
with s.active and m.id=s.key
then enable action {
// create new subscription(true,m.id)
}

TABLE 8

Example of a Pack Pallet Process rule pack_pallet:
if (exists Message m) (exists Subscription s)
with s.active and m.id=s.key
then enable action {
// collect message, then delete message instance
}

Referring to Tables 7 and 8, the subscription variables are bound by a "non exists" quantifier in "conditional_start." Collecting the message is then, again, represented by a regular rule (e.g., "pack_pallet" of Table 8), where all variables are bound by non-negated, existential quantifiers.

In the given example process scenario, there is initially no subscription and two messages with the same identifier, such as m1(4711) and m2(4711) which are received at state correlation engine 145 one after the other in two transaction t1 and t2. When t1 commits, concurrency controller 125 evaluates both the "conditional_start" and "pack_pallet" condition. As there is no subscription yet, the condition of "conditional_start" holds true and the respective action script is enabled (but not yet executed). Inhibitor clauses (not exists . . . with . . . ) are also checked by join operators, which will (during the evaluation) place rowlocks on the affected row (e.g., the one with a key of 4711). As described before, these row locks exist for the duration of the transaction (t1) and will be released when it ultimately completes. When t2 commences and checks the rule conditions, it re-visits the same join operator that was already used by t1 before. As the respective row lock of t1 is, by now, gone, t2 can complete its operation, ultimately ending up in two transitions "conditional_start" (instantiated with m1 and m2, respectively) ready for being asynchronously scheduled and executed. Up to this point, there is neither a violation of the ready set consistency nor any violation of the ACID criterion. At this point, both transitions may execute in parallel and there is until now no mechanism preventing them from doing so since state variable locks are compatible or disjoint and join rowlocks can be serialized (e.g., by having t2 wait until t1 has committed and, thus, released all row locks in jointly visited join operators). However, both t1 and t2 are about to create a new subscription instance with a key of 4711 while simultaneously relying on the fact that there is not yet a subscription. Intuitively, one can conclude that one transaction should execute whereas the other one must not complete (there should not be two subscriptions for the same key). In order to avoid this behavior, concurrency controller 125 provides optimistic, condition-based concurrency control (which exclusively addresses ready set consistency) to avoid any transaction violating the conditions of other running transitions. Interestingly, the latter is already avoided by the other concurrency control mechanisms for transitions that base on conditions where state variables are exclusively bound by existential quantifiers. It is only those transitions, which check for "non existence" of a state variable that complies with a certain condition, which are not covered by state variable locking or join operator row locking. Analogous to database concurrency control, this problem is similar to the so-called "phantom problem" where queries incorporate a complete table (e.g., to compute some aggregate value over multiple rows). Databases either ignore this problem (thus, not achieving the serializable isolation level) or place a lock on the entire table. The latter greatly hampers concurrent accesses to this table, which is why system 100 typically does not adopt a similar strategy of locking the complete type of a state variable (which corresponds to an entire table of a relational database system).

Instead, system 100 utilizes the intrinsic condition evaluation mechanism (e.g., described above with respect to FIGS. 2 and 3) itself to solve this issue. In detail, there are two possible scenarios. In the first scenario, suppose t1 commits before t2 is scheduled (or vice versa). During the commit executed by state correlation engine 145, the create update (e.g., . →Subscription(true, 4711)) is pushed through the trigger network and ultimately disables both instances of "conditional_start" (e.g., the one with the parameter m1, which still runs and currently commits and the one with the parameter m2, which may not have started yet). In the second scenario, t1 and t2 were started in parallel, their commit will be serialized during condition evaluation. This is because both need to access the same row in the join state (key 4711). The one that acquires the rowlock first will continue to commit and, finally try to disable both itself (e.g., t1) and the other transition as well (e.g., t2). Other than in the first scenario, t2 is already running and cannot be disabled (e.g., removed from the ready set). There are thus two options of (1) aborting t2 from outside or (2) rolling back t1. Although concurrency controller 125 typically implements a rollback, the externally triggered abort of t2 may also be used. As such, t2 may then complete normally (e.g., t1 does not exist any longer and has rolled back by then). The concurrency controller 125 and its use of the above described optimistic concurrency control improves throughput (e.g., efficiency), when compared to locking the entire type (e.g., the entire "Subscription"). Other transitions operating on unrelated subscription instances will not be affected at all and may execute in parallel.

The subject matter described herein can be implemented in a computing system that includes a backend component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet. The computing system can include clients and servers. A client and server are generally remote from each other in a logical sense and typically interact through a communication network. The relationship of client and server arises by virtue of computer programs running on the respective computers and having a client-server relationship to each other.

The systems and methods disclosed herein may be embodied in various forms including, for example, a data processor, such as a computer that also includes a database, digital electronic circuitry, firmware, software, or in combinations of them. Moreover, the above-noted features and other aspects and principles of the present disclosed embodiments may be implemented in various environments. Such environments and related applications may be specially constructed for performing the various processes and operations according to the disclosed embodiments or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the disclosed embodiments, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" may refer to any entity including a person or a computer.

The foregoing description is intended to illustrate but not to limit the scope of the invention, which is defined by the scope of the appended claims. Other embodiments are within the scope of the following claims.

What is claimed:

1. A computer program product comprising a non-transitory machine-readable medium storing instructions that, when executed by at least one programmable processor, cause the at least one programmable processor to perform operations comprising:

receiving, at a rules processor of a state correlation engine, a plurality of events having a plurality of event condition action ("ECA") rules, each including an event part, a condition part, and an action part;

evaluating, at the rules processor, the ECA rules to determine whether to synchronously or asynchronously execute the action parts; and executing, at the rules processor, each of the ECA rules using a transaction roundtrip, the executing including executing the action parts by performing at least one update of a state of the state correlation engine and the rules processor;

evaluating the condition parts of the ECA rules on the updated state of the state correlation engine and the rules processor;

upon the rules processor determining to synchronously execute at least one action part as a result of processing the condition parts, directly executing the action parts of synchronous ECA rules of the ECA rules, whose condition parts are in effect, by re-entering the roundtrip transaction cycle in a nested transaction; and upon the rules processor determining to asynchronously execute at least one action part as a result of processing the condition parts, scheduling for execution the action parts of the asynchronous transaction rules of the ECA rules, whose condition parts are in effect to be executed, in other follow-up transactions, wherein the action parts of the asynchronous transaction rules of the ECA rules are inserted into a ready set of actions for subsequent execution, the execution of each of the actions in the ready set of actions is performed using a separate, concurrent thread, wherein the concurrency of the actions is controlled using a control mechanism;

wherein the ready set of actions includes transitions with a tuple of state variables and action scripts that are ready to be scheduled for asynchronous execution;

wherein the control mechanism includes a state variable locking control mechanism in which a state variable is exclusively locked for a write access; and wherein, during a commit phase of a transition within the ready set of actions, condition parts of the ECA rules corresponding to actions within the ready set of actions are re-evaluated to disable transitions whose condition parts are no longer true;

wherein the control mechanism includes a fine-granular condition evaluation operator state locking control mechanism for which the state correlation engine maintains an internal data structure, the internal data structure including a join state table representing an equality predicate between two state variables, wherein the join state table includes a key attribute representing a match of the two state variables, and a stateful join operator exclusively locks an accessed row identified by a particular key during a transaction accessing one of the state variable in the row of the particular key.

2. The computer-readable medium of claim 1, wherein the control mechanism further comprises a condition-based, optimistic concurrency control mechanism.

3. The computer-readable medium of claim 1, wherein the operations further comprise
enabling, based on whether the condition associated with a rule is satisfied, the action associated with that rule.

4. The computer-readable medium of claim 1, wherein the operations further comprise
including the enabled actions in a ready set, to be scheduled for execution.

5. The computer-readable medium of claim 1, wherein the operations further comprise
disabling, based on whether the condition associated with a rule is not satisfied, the action associated with that rule, the disabled actions removed from the ready set for execution.

6. The computer-readable medium of claim 1, wherein the operations further comprise
executing each of the ready set actions using the separate, concurrent thread, the threads executed separately.

7. A computer-implemented method comprising:
receiving, at a rules processor of a state correlation engine, a plurality of events having a plurality of event condition action ("ECA") rules, each including an event part, a condition part, and an action part;
evaluating, at the rules processor, the ECA rules to determine whether to synchronously or asynchronously execute the action parts; and
executing, at the rules processor, each of the ECA rules using a transaction roundtrip, the executing including
executing the action parts by performing at least one update of a state of the state correlation engine and the rules processor;
evaluating the condition parts of the ECA rules on the updated state of the state correlation engine and the rules processor;
upon the rules processor determining to synchronously execute at least one action part as a result of processing the condition parts, directly executing the action parts of synchronous ECA rules of the ECA rules, whose condition parts are in effect, by re-entering the roundtrip transaction cycle in a nested transaction; and
upon the rules processor determining to asynchronously execute at least one action part as a result of processing the condition parts, scheduling for execution the action parts of the asynchronous transaction rules of the ECA rules, whose condition parts are in effect to be executed, in other follow-up transactions, wherein the action parts of the asynchronous transaction rules of the ECA rules are inserted into a ready set of actions for subsequent execution, the execution of each of the actions in the ready set of actions is performed using a separate, concurrent thread, wherein the concurrency of the actions is controlled using a control mechanism;
wherein the ready set of actions includes transitions with a tuple of state variables and action scripts that are ready to be scheduled for asynchronous execution;

wherein the control mechanism includes a state variable locking control mechanism in which a state variable is exclusively locked for a write access; and
wherein, during a commit phase of a transition within the ready set of actions, condition parts of the ECA rules corresponding to actions within the ready set of actions are re-evaluated to disable transitions whose condition parts are no longer true;
wherein the control mechanism includes a fine-granular condition evaluation operator state locking control mechanism for which the state correlation engine maintains an internal data structure, the internal data structure including a join state table representing an equality predicate between two state variables, wherein the join state table includes a key attribute representing a match of the two state variables, and a stateful join operator exclusively locks an accessed row identified by a particular key during a transaction accessing one of the state variable in the row of the particular key.

8. The method of claim 7, wherein the control mechanism further comprises a condition-based, optimistic concurrency control mechanism.

9. The method of claim 7, further comprising
enabling, based on whether the condition associated with a rule is satisfied, the action associated with that rule.

10. The method of claim 7, further comprising
including the enabled actions in a ready set, to be scheduled for execution.

11. The method of claim 7, further comprising
disabling, based on whether the condition associated with a rule is not satisfied, the action associated with that rule, the disabled actions removed from the ready set for execution.

12. The method of claim 7, further comprising
executing each of the ready set actions using the separate, concurrent thread, the threads executed separately.

13. A system comprising:
at least one programmable processor; and
a non-transitory machine-readable medium storing instructions that, when executed by the at least one programmable processor, cause the at least one programmable processor to perform operations comprising:
receiving, at a rules processor of a state correlation engine, a plurality of events having a plurality of event condition action ("ECA") rules, each including an event part, a condition part, and an action part;
evaluating, at the rules processor, the ECA rules to determine whether to synchronously or asynchronously execute the action parts; and
executing, at the rules processor, each of the ECA rules using a transaction roundtrip, the executing including
executing the action parts by performing at least one update of a state of the state correlation engine and the rules processor;
evaluating the condition parts of the ECA rules on the updated state of the state correlation engine and the rules processor;
upon the rules processor determining to synchronously execute at least one action part as a result of processing the condition parts, directly executing the action parts of synchronous ECA rules of the ECA rules, whose condition parts are in effect, by re-entering the roundtrip transaction cycle in a nested transaction; and upon the rules processor determining to asynchronously execute at least one action part as a result of processing the condition parts, scheduling for execution the action parts of the asynchronous transaction rules of the ECA rules, whose condition parts are in effect to be executed, in other follow-up transactions, wherein the action parts of the asynchronous transaction rules of the ECA rules are inserted into a ready set of actions for subsequent execution, the execution of each of the actions in the ready set of actions is performed using a separate, concurrent thread, wherein the concurrency of the actions is controlled using a control mechanism;

wherein the ready set of actions includes transitions with a tuple of state variables and action scripts that are ready to be scheduled for asynchronous execution;

wherein the control mechanism includes a state variable locking control mechanism in which a state variable is exclusively locked for a write access; and wherein, during a commit phase of a transition within the ready set of actions, condition parts of the ECA rules corresponding to actions within the ready set of actions are re-evaluated to disable transitions whose condition parts are no longer true;

wherein the control mechanism includes a fine-granular condition evaluation operator state locking control mechanism for which the state correlation engine maintains an internal data structure, the internal data structure including a join state table representing an equality predicate between two state variables, wherein the join state table includes a key attribute representing a match of the two state variables, and a stateful join operator exclusively locks an accessed row identified by a particular key during a transaction accessing one of the state variable in the row of the particular key.

14. The system of claim 13, wherein the control mechanism further comprises a condition-based, optimistic concurrency control mechanism.

15. The system of claim 13, wherein the operations further comprise
enabling, based on whether the condition associated with a rule is satisfied, the action associated with that rule.

16. The system of claim 13, wherein the operations further comprise
including the enabled actions in a ready set, to be scheduled for execution.

17. The system of claim 13, wherein the operations further comprise
disabling, based on whether the condition associated with a rule is not satisfied, the action associated with that rule, the disabled actions removed from the ready set for execution.

18. The system of claim 13, wherein the operations further comprise executing each of the ready set actions using the separate, concurrent thread, the threads executed separately.

* * * * *